Figure 1:
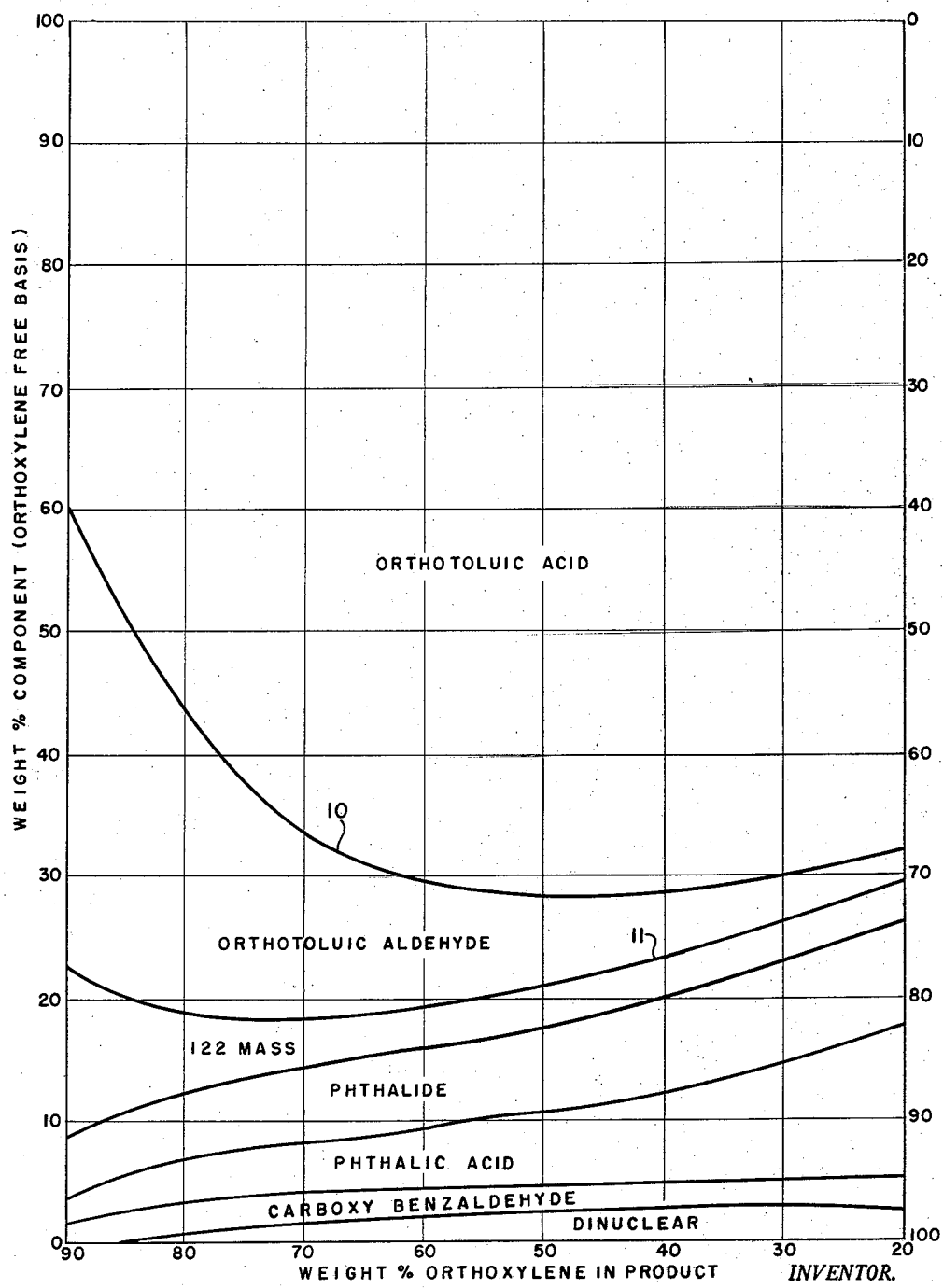

INVENTOR.
HARRY E. CIER,

United States Patent Office 3,088,974
Patented May 7, 1963

3,088,974
EXOTHERMIC REACTION PROCESS
Harry E. Cier, Baytown, Tex., assignor, by mesne assignments, to Esso Research and Engineering Company, Elizabeth, N.J., a corporation of Delaware
Filed Nov. 14, 1958, Ser. No. 774,066
4 Claims. (Cl. 260—524)

This invention relates to processes including an exothermic reaction. More particularly, the invention relates to a novel process in which the heat generated by the exothermic reaction is used to vaporize that portion of a liquid reactant which does not react to form reaction products.

The exothermic reaction process to be described herein can be used whenever the unreacted liquid reactant used in the process can be vaporized from the reaction products. One example of such a process is the oxidation of xylenes to the corresponding toluic acids and other reaction products. The unreacted xylenes can be vaporized leaving the reaction products in liquid form. Other processes for which this new process has utility are in the oxidation of the following: trimethyl benzenes, methyl ethyl benzenes, toluene, ethyl benzene, tetramethyl benzenes, cyclohexane, isopropyl benzene, and diisopropyl benzenes.

In one of its broader aspects, the new process includes the step of combining a liquid reactant with a second reactant at an elevated pressure to react a portion of the liquid reactant. The unreacted liquid reactant along with the reaction products are then flowed to an area kept at a pressure lower than the particular pressure at which the reaction occurs. The lower pressure area is in thermal contact with the reaction area. Thus, the heat of the reaction can be used to vaporize the unreacted liquid reactant. The unreacted liquid reactant may then be condensed and recycled back to the reaction area.

In one of its particular aspects, the new process is used and particularly adapted for the oxidation of xylenes to toluic acids. For example, orthoxylene can be oxidized into orthotoluic acid and other reaction products. Orthoxylene is fed to a reaction chamber. An oxidizing agent such as air may also be fed to the chamber. The orthoxylene is partially oxidized in the chamber to form reaction products including a high percentage of orthotoluic acid. The temperature in the reaction chamber is high enough to cause the reaction. The pressure in the chamber is kept high enough to prevent extensive vaporization of the orthoxylene, which has not been oxidized. The unreacted orthoxylene along with the reaction products are flowed to an area which is kept at essentially atmospheric pressure. This atmospheric pressure area is in thermal contact with the reaction chamber. The heat from the reaction in the reaction chamber is thereby used to vaporize the unreacted orthoxylene, which is in the essentially atmospheric pressure area. This heat is sufficient to vaporize the unreacted orthoxylene, but not sufficient to vaporize the other reaction products. The vaporized orthoxylene may then be condensed and recycled to the reaction chamber. The reaction products containing a high percentage of orthotoluic acid are removed.

Figure 2:
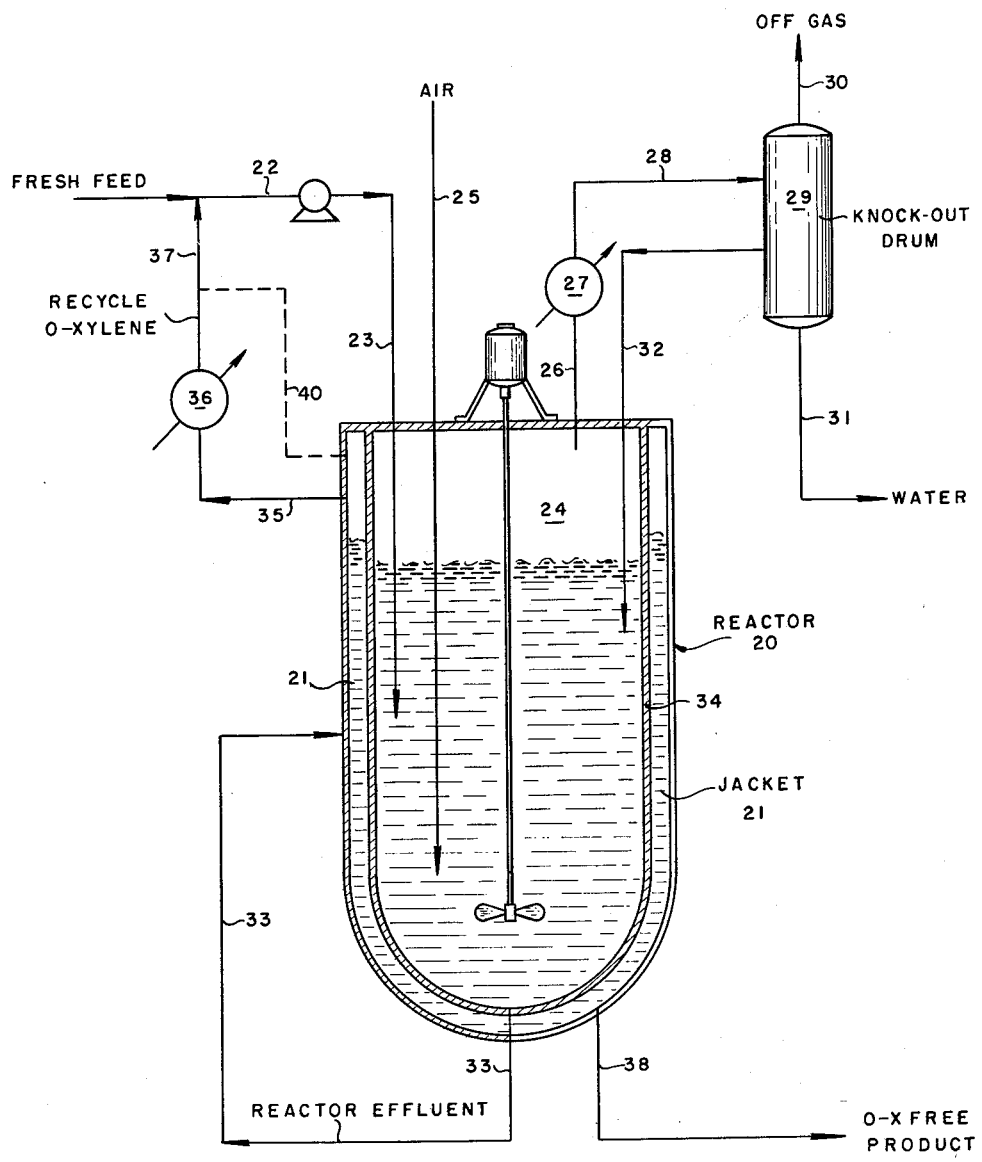

The invention as well as its many advantages will be further understood by the following detailed description and drawings in which:

FIG. 1 is a graphic representation useful in explaining the advantages of my invention when used in oxidizing orthoxylene to orthotoluic acid; and FIG. 2 is a schematic representation of one system which can be used in carrying out the new process.

The liquid phase oxidation of orthoxylene may be considered as a consecutive reaction as indicated by the following equation:

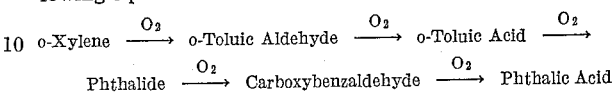

$$\text{o-Xylene} \xrightarrow{O_2} \text{o-Toluic Aldehyde} \xrightarrow{O_2} \text{o-Toluic Acid} \xrightarrow{O_2}$$

$$\text{Phthalide} \xrightarrow{O_2} \text{Carboxybenzaldehyde} \xrightarrow{O_2} \text{Phthalic Acid}$$

Each successive compound in the above equation represents a material containing more oxygen than the previous component. In addition to these consecutive reaction products, side reactions occur. Ideally, the reaction would be conducted to the point where all of the orthoxylene is converted to the aldehyde and all of the aldehyde is converted to the toluic acid with none of the more highly oxidized components formed. Such ideal cases are not encountered in practice. Any material containing more oxygen than the orthotoluic acid, as indicated by the above equation, is undesirable since it cannot be readily converted to the toluic acid. The aldehyde, however, can be easily separated from the reaction product, and returned to the reaction system where it will be oxidized to give toluic acid. Therefore, it is desirable to operate a system of this sort in such a way that the maximum amount of orthotoluic acid and toluic aldehyde is produced. The toluic aldehyde is then subsequently separated from the product and recycled to the reactor system.

A series of runs were made in a batch reactor. These runs were made to determine the change in composition of the components of the reaction product with respect to the percentage of orthoxylene converted. The average results of these runs are shown in FIG. 1, This figure shows along the vertical lines the percentage by weight of each of the reaction product components on an orthoxylene-free basis. The horizontal lines represent the percentage by weight of orthoxylene in the product. With any particular weight percentage of orthoxylene in the product, the vertical distance from the top horizontal line to curve 10 represents the percentage of orthotoluic acid in the reaction product of an orthoxylene-free basis. The vertical distance from the top horizontal line to curve 11 represents the weight percentage of orthotoluic acid plus orthotoluic aldehyde in the reaction product on an orthoxylene-free basis. For example, if 50% by weight of orthoxylene is in the product, approximately 79% by weight of orthotoluic acid and orthotoluic aldehyde will be in the product on an orthoxylene-free basis. Of this 79%, approximately 72% will be orthotoluic acid and 7% orthotoluic aldehyde.

In addition to the reaction products indicated in the above equation, FIG. 1 includes materials identified as dinuclear compounds and as 122 mass material. The 122 mass material is probably a mixture of such materials as benzoic acid, toluic alcohol, etc. The exact nature of the 122 mass material is not known and may be undesirable in so far as this invention is concerned. The dinuclear compounds consist of diphenyl type of hydrocarbons and esters. The esters can be hydrolyzed into useful products. The more desirable products from this process are toluic aldehyde and toluic acid.

The sum of the orthotoluic acid plus the orthotoluic aldehyde in the reaction product is greatest when the amount of orthoxylene converted ranges from 15 to 45%, leaving 85 to 55% orthoxylene in the product. In this range of conversion, the maximum amount of useful product varies from 80 to 82%. The amount of orthotoluic acid in this mixture will range from 72 to 50%.

The time of reaction and temperatures must be controlled to convert the desired 15 to 45% of orthoxylene. The time of reaction is dependent upon the oxidizing material and the catalyst used. If the time of reaction is too long, an undesired amount of products more highly oxidized than orthotoluic acid will be formed from the orthotoluic aldehyde and orthotoluic acid thus decreasing the percentage of desired products.

The data shown in FIG. 1 illustrates the desirability of maintaining the conversion of orthoxylene at a low level. However, from a practical point of view, this may be uneconomical. For example, it is indicated that for each part of orthoxylene converted would require facilities to distill from 1 to 6 parts of orthoxylene. This requires high investment cost for the equipment and a high increase in operation cost for the process. These disadvantages, however, are overcome by using my new process. In using this process, the unreacted orthoxylene and the reaction products comprising the reactor effluent is used as a means for controlling the temperature in a reactor. Not only does this operate to give a uniform control of reaction temperature, but it also produces a product free of orthoxylene for no substantial additional investment or operating cost.

Referring to FIG. 2, one system for carrying out my new process is diagrammatically shown. The reaction is carried out in a stirred reactor 20. Reactor 20 is provided with a jacket 21. Orthoxylene containing a catalyst such as cobalt naphthanate is pumped through lines 22 and 23 to the reaction chamber 24 of the reactor 20. Air is continuously admitted to the chamber 24 through line 25 for the purpose of converting the orthoxylene to toluic acid concentrate.

The chamber 24 of reactor 20 is maintained at elevated pressure and temperature. The temperature is high enough to efficiently carry out the desired reaction. The pressure should be high enough to prevent excessive vaporization of the unreacted xylenes from the chamber 24.

The spent air consisting essentially of nitrogen, water vapor, and xylene vapor passes upwardly from the chamber 24 through line 26 to a condenser 27. From condenser 27 the nitrogen, condensed water vapor, and condensed xylene vapor passes through line 28 to a knockout drum 29. Here the water and hydrocarbon are collected as liquids and the noncondensible nitrogen is discharged to the atmosphere through line 30. The water is drained off to the sewer through line 31. The orthoxylene is returned to the chamber 24 through line 32.

The reaction products and the unreacted orthoxylene are withdrawn from the bottom of the chamber 24 and flowed through line 33 to the jacket 21. The inside wall 34 of jacket 21 separates the unreacted orthoxylene and liquid products from the reaction chamber 24. The pressure within the jacket 21 is somewhat lower than the pressure in the chamber 24. Jacket 21 may be kept at atmospheric pressure.

The material in jacket 21 is in thermal contact with chamber 24 through the wall 34. Thus, the heat from the oxidation reaction is transmitted through wall 34 to the unreacted orthoxylene and reaction products in jacket 21. The amount of heat conducted through the wall 34 into jacket 21 must be sufficiently high to vaporize the orthoxylene at the particular pressure in jacket 21 but low enough to fail to vaporize the oxidation products.

The vaporized orthoxylene is conducted through line 35 to a condenser 36. The liquefied orthoxylene is then passed through line 37 to line 22 and recycled back to the reaction chamber 24.

The stream of product is withdrawn from the bottom of reactor jacket 21 through line 38. This material is essentially free of orthoxylene. It will contain a minimum amount of material heavier than orthotoluic acid and will contain significant quantities of toluic aldehyde. The toluic aldehyde will be subsequently separated therefrom and returned to the reactor system for further oxidation. The materials heavier than orthotoluic acid will be also removed and disposed of.

As a specific example, fresh feed may be fed to the chamber 24 at 100 pounds per hour and a recycle stream at 220 pounds per hour. Air is supplied to the chamber 24 at 48 s.c.f.m. The reactor chamber 24 is operated at a temperature in the range of 250 to 500° F. with 350 to 400° F. being a preferred temperature range. The reactor pressure should be well above atmospheric, say in the range of 100 to 500 p.s.i.g. The material in the jacket 21 will be at a temperature somewhat lower than the reaction chamber 24 temperature. The temperature, however is sufficiently high to vaporize the unreacted xylene in jacket 21 which vaporizes at approximately 290° F. at atmospheric pressure. The pressure in the jacket may be maintained at atmospheric pressure.

Approximately 346 pounds per hour of unreacted orthoxylene and reaction products will flow through line 33. The reactor effluent will consist of approximately 63% orthoxylene and 37% oxidation products. About 126 pounds per hour of orthoxylene-free product will be removed from the jacket 21 through line 38.

It can be shown that approximately 9 parts of orthoxylene can be vaporized from the heat released when one part of orthoxylene is converted to orthotoluic acid. Therefore, as much as 9 volumes of xylene may be removed by vaporization by each volume of xylene, which is converted to oxidation products. Lower degrees of conversion are limited by the amount of heat which can be generated by the reaction to completely vaporize the orthoxylene. If higher levels of conversion are desired, adequate cooling can be obtained. This cooling can be obtained by returning some of the recycled orthoxylene stream through line 40 (indicated in dashed line) to the reactor jacket 21 as reflux. This provides additional temperature control of the process.

I claim:

1. A process for oxidizing xylenes to obtain reaction products with a high percentage of toluic acids comprising the steps of: at elevated pressure and elevated temperature, reacting in a reaction vessel a portion of the xylenes with an oxidizing agent to produce an effluent containing from 85% to 55% by weight unreacted xylenes and reaction products; and flowing the unreacted xylenes and reaction products to a confined space at substantially atmospheric pressure and in thermal contact with the reaction vessel, the temperature in the reaction vessel being high enough to provide a temperature in said confined space above the boiling point of the unreacted xylenes and below the boiling points of the oxidation products whereby the unreacted xylenes are vaporized by the heat generated by the reaction, condensing the vaporized xylenes and recycling the condensed xylenes to the reaction vessel; and removing the xylene-free reaction products.

2. A process in accordance with claim 1 wherein a portion of the condensed xylenes is fed to said confined space to aid in temperature control of the process.

3. A process for oxidizing orthoxylene to obtain reaction products with a high percentage of orthotoluic acid comprising the steps of: reacting a portion of the orthoxylene with air at a pressure ranging from 100 to 500 p.s.i.g. and a temperature ranging from 250 to 500° F. to produce an effluent containing from 85% to 55% by weight unreacted orthoxylene and reaction products; flowing the unreacted orthoxylene and reaction products to an area at essentially atmospheric pressure and in thermal contact with the reaction area to thereby vaporize the unreacted orthoxylene with the heat generated by the reaction; condensing the vaporized orthoxylene and recycling the condensed orthoxylene to the reaction area; and removing the orthoxylene-free reaction products.

4. A process in accordance with claim 3 wherein a portion of the condensed orthoxylene is fed to the area at essentially atmospheric pressure in contact with the reaction area to aid in temperature control of the process.

References Cited in the file of this patent

UNITED STATES PATENTS

| | | |
|---|---|---|
| 1,987,552 | Fauser | Jan. 8, 1935 |
| 2,081,120 | Reynolds | May 18, 1937 |
| 2,696,499 | Himel | Dec. 7, 1954 |
| 2,712,549 | Cheney | July 5, 1955 |